(12) United States Patent
Santhar et al.

(10) Patent No.: US 12,210,834 B2
(45) Date of Patent: Jan. 28, 2025

(54) TEXT SUMMARIZATION WITH EMOTION CONDITIONING

(71) Applicant: INTERNATIONAL BUSINESS MACHINES CORPORATION, Armonk, NY (US)

(72) Inventors: Sathya Santhar, Ramapuram (IN); Sarbajit K. Rakshit, Kolkata (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 17/932,732

(22) Filed: Sep. 16, 2022

(65) Prior Publication Data

US 2024/0095456 A1    Mar. 21, 2024

(51) Int. Cl.
*G06F 40/20* (2020.01)
*G06F 40/30* (2020.01)

(52) U.S. Cl.
CPC .............. *G06F 40/30* (2020.01); *G06F 40/20* (2020.01)

(58) Field of Classification Search
CPC ................................. G06F 40/30; G06F 40/20
USPC ......................................................... 704/260
See application file for complete search history.

(56) References Cited

U.S. PATENT DOCUMENTS

| 11,074,284 | B2* | 7/2021 | Cunico | G06F 16/38 |
| 11,854,575 | B1* | 12/2023 | Pinkus | G10L 25/63 |
| 2017/0372203 | A1 | 12/2017 | Bharti | |
| 2019/0236139 | A1* | 8/2019 | DeFelice | G06N 3/044 |
| 2019/0236148 | A1* | 8/2019 | DeFelice | G06N 3/047 |
| 2020/0349222 | A1 | 11/2020 | Kadambi | |
| 2021/0150140 | A1* | 5/2021 | Galitsky | G06F 16/9027 |
| 2023/0132217 | A1* | 4/2023 | Schroder | G16H 50/20 |
| | | | | 705/2 |
| 2023/0223008 | A1* | 7/2023 | Kumar | G10L 13/08 |
| | | | | 704/259 |

FOREIGN PATENT DOCUMENTS

| CN | 111475640 A | 7/2020 |
| KR | 102348689 B1 | 1/2022 |
| KR | 20240012047 A * | 7/2022 |

OTHER PUBLICATIONS

E. Batbaatar, M. Li and K. H. Ryu, "Semantic-Emotion Neural Network for Emotion Recognition From Text, " in IEEE Access, vol. 7, pp. 111866-111878, 2019, doi: 10.1109/ACCESS.2019. 2934529. keywords: {Emotion recognition;Semantics; Neural networks; Task analysis; Deep learning; Dictionaries; Emotion recognit (Year: 2019).*

(Continued)

*Primary Examiner* — Bharatkumar S Shah
(74) *Attorney, Agent, or Firm* — Andre Adkins

(57) ABSTRACT

A method, computer program, and computer system are provided for text summarization that maintains emotional content. Data corresponding to text to be summarized and a target emotion to be maintained in the text to be summarized is received. The target emotion is encoded as an emotion probability vector. One or more words that correspond to the target emotion that is encoded in the emotion probability vector are identified from a dictionary. A text summary to be associated with the text to be summarized is generated based on the one or more identified words.

20 Claims, 6 Drawing Sheets

(56) References Cited

OTHER PUBLICATIONS

S. Zaware, D. Patadiya, A. Gaikwad, S. Gulhane and A. Thakare, "Text Summarization using TF-IDF and Textrank algorithm," 2021 5th International Conference on Trends in Electronics and Informatics (ICOEI), Tirunelveli, India, 2021, pp. 1399-1407, doi: 10.1109/ICOEI51242.2021.9453071. keywords: {Patent (Year: 2021).*
E. Batbaatar, M. Li and K. H. Ryu, "Semantic-Emotion Neural Network for Emotion Recognition From Text," in IEEE Access, vol. 7, pp. 111866-111878, 2019, doi: 10.1109/ACCESS.2019.2934529. keywords: {Emotion recognition;Semantics; Neural networks; Task analysis; Deep learning; Dictionaries; Emotion rec (Year: 2019).*
S. Zaware, D. Patadiya, A. Gaikwad, S. Gulhane and A. Thakare, "Text Summarization using TF-IDF and Textrank algorithm," 2021 5th International Conference on Trends in Electronics and Informatics (ICOE)), Tirunelveli, India, 2021, pp. 1399-1407, doi: 10.1109 NICOEI51242.2021.9453071. keywords: {Patent (Year: 2021).*
Fan, et al., "Controllable Abstractive Summarization," Proceedings of the 2nd Workshop on Neural Machine Translation and Generation, Jul. 20, 2018, ACM, pp. 45-54.
Ghosh, et al., "Affect-LM: A Neural Language Model for Customizable Affective Text Generation," arXiv:1704.06851v1 [cs.CL], Apr. 22, 2017, 9 pgs.
Saito, et al., "Length-Controllable Abstractive Summarization by Guiding with Summary Prototype," arXiv:2011.07331v1 [cs.CL], Jan. 21, 2020, 8 pgs.

* cited by examiner

TEXT SUMMARIZATION WITH EMOTION CONDITIONING

FIELD

This disclosure relates generally to field of natural language processing, and more particularly to text summarization.

BACKGROUND

Text summarization is the task of condensing a piece of text to a shorter version by reducing the size of the initial text while preserving key informational elements and the meaning of the content. Text summarization may be used to create a coherent and fluent summary having only the main points outlined in the document. Modern computer software presents the opportunity to use natural language processing techniques to automatically summarize text content of any size in a rapid and efficient manner. Automatic text summarization, therefore, is the task of producing using computer software tools a concise and fluent summary without any human help while preserving the meaning of the original text document, presenting advantages in terms of time savings, efficiency, and cost savings to avoid a human needing to review summarize text, which may not even be possible in the digital age where text could comprise millions of books, journal articles, newspapers, etc. available online.

SUMMARY

Embodiments relate to a method, system, and computer readable medium for text summarization. According to one aspect, a method for text summarization is provided. The method may include receiving data corresponding to text to be summarized and a target emotion to be maintained in the text to be summarized. The target emotion is encoded as an emotion probability vector. One or more words that correspond to the target emotion that is encoded in the emotion probability vector are identified from a dictionary. A text summary to be associated with the text to be summarized is generated based on the one or more identified words.

According to another aspect, a computer system for text summarization is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to text to be summarized and a target emotion to be maintained in the text to be summarized. The target emotion is encoded as an emotion probability vector. One or more words that correspond to the target emotion that is encoded in the emotion probability vector are identified from a dictionary. A text summary to be associated with the text to be summarized is generated based on the one or more identified words.

According to yet another aspect, a computer readable medium for text summarization is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to text to be summarized and a target emotion to be maintained in the text to be summarized. The target emotion is encoded as an emotion probability vector. One or more words that correspond to the target emotion that is encoded in the emotion probability vector are identified from a dictionary. A text summary to be associated with the text to be summarized is generated based on the one or more identified words.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
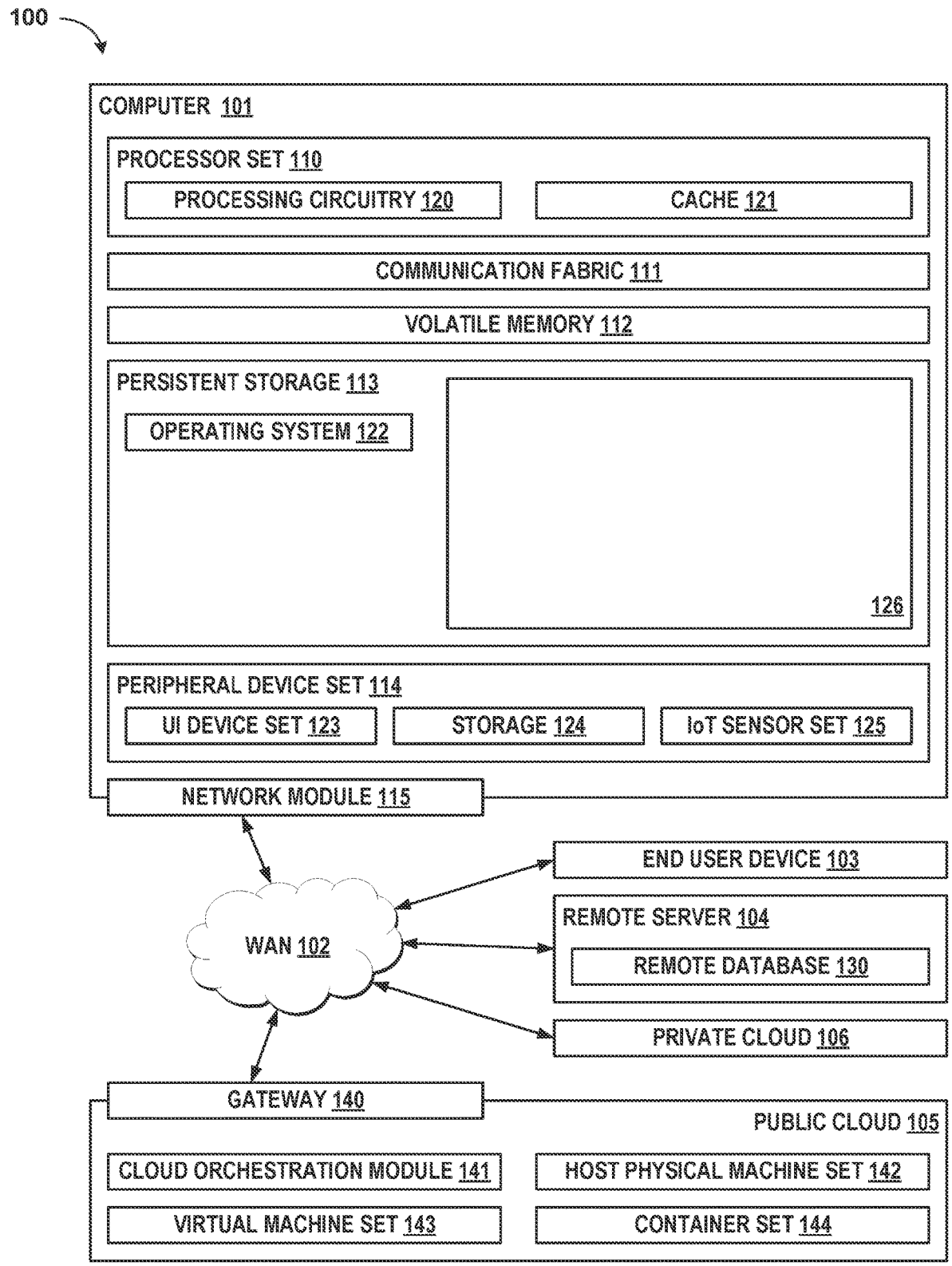
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of natural language processing, and more particularly to text summarization. The following described exemplary embodiments provide a system, method, and computer program to, among other things, summarize text while allowing a user to choose an emotional content of the summary to be retained in the generated summary. Therefore, some embodiments have the capacity to improve the field of computing by allowing automation of parsing through large quantities of data in order to help users better use their time to make crucial decisions. Text summarization with emotion conditioning can also be used in various natural language processing tasks such as news summarization and headline generation. Moreover, the generation of summaries can be integrated into these systems as an intermediate stage which helps to reduce the length of the document.

As previously described, text summarization is the task of condensing a piece of text to a shorter version by reducing the size of the initial text while preserving key informational elements and the meaning of the content. Text summarization may be used to create a coherent and fluent summary having only the main points outlined in the document. Automatic text summarization, therefore, is the task of producing a concise and fluent summary without any human help while preserving the meaning of the original text document.

In general, there are two different approaches for automatic summarization: extraction and abstraction. Extractive text summarization technique involves pulling key phrases from the source document and combining them to make a summary. The extraction is made according to the defined metric without making any changes to the texts. Abstractive summarization methods aim at producing a summary by interpreting the text using advanced natural language techniques in order to generate a new shorter text that conveys the most critical information from the original text, requiring rephrasing sentences and incorporating information from full text to generate summaries such as a human-written abstract usually does.

Automatic text summarization is a complex and challenging task. When a human summarize a piece of text, one reads it entirely to develop one's understanding before writing a summary to highlight its main points. Since computers lack human knowledge and language capability, automatic text summarization is, therefore, a very difficult and non-trivial task because the summary should be accurate and should read fluently as a new standalone document while capturing the essence of the source document. Specifically, emotion can be expressed in many ways that can be seen such as facial expression and gestures, speech, and written text. Emotion detection in text documents is essentially a content-based classification problem involving concepts from natural language processing and machine learning. While existing text summarization methods may enable the reader to control some important aspects of the generated summary, there is no flexibility to the user to control the emotions and empathy to be depicted in the summarized text. For example, a journalist might want to summarize a neutral news as a happy one to please the local readers' preferred emotion. The factual information of the summary remains the same as the original news but the way it is conveyed and summarized is what brings in a lot of value in eliminating manual interventions.

Currently, there is no way for a user to control a specific emotion of his choice (including happiness, anger, sadness, sarcasm, vengeance, surprise, disgust etc.) that may need to be retained in the generated summary. For instance, the original text description may describe a fact with little to no emotional content involved. If a user wants to generate a summary depicting sadness for the factual description, there is currently no way to optimize the text summarization with his choice of sentiment in the summary. It may be advantageous, therefore, to condition textual data based on emotion recognition while generating a summary of the text. Specifically, given a source sentence undergoing emotion-centric text summarization, a user may generate summary of input text based on a conditioned target emotion according to the user's preference.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program that summarizes text based on emotion conditioning. Referring now to FIG. 1, a computing environment 100 contains an example of an environment for the execution of at least some of the computer code involved in performing the inventive methods, such as text summarization 126. In addition to text summarization 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and text summarization 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in text summarization 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in text summarization 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
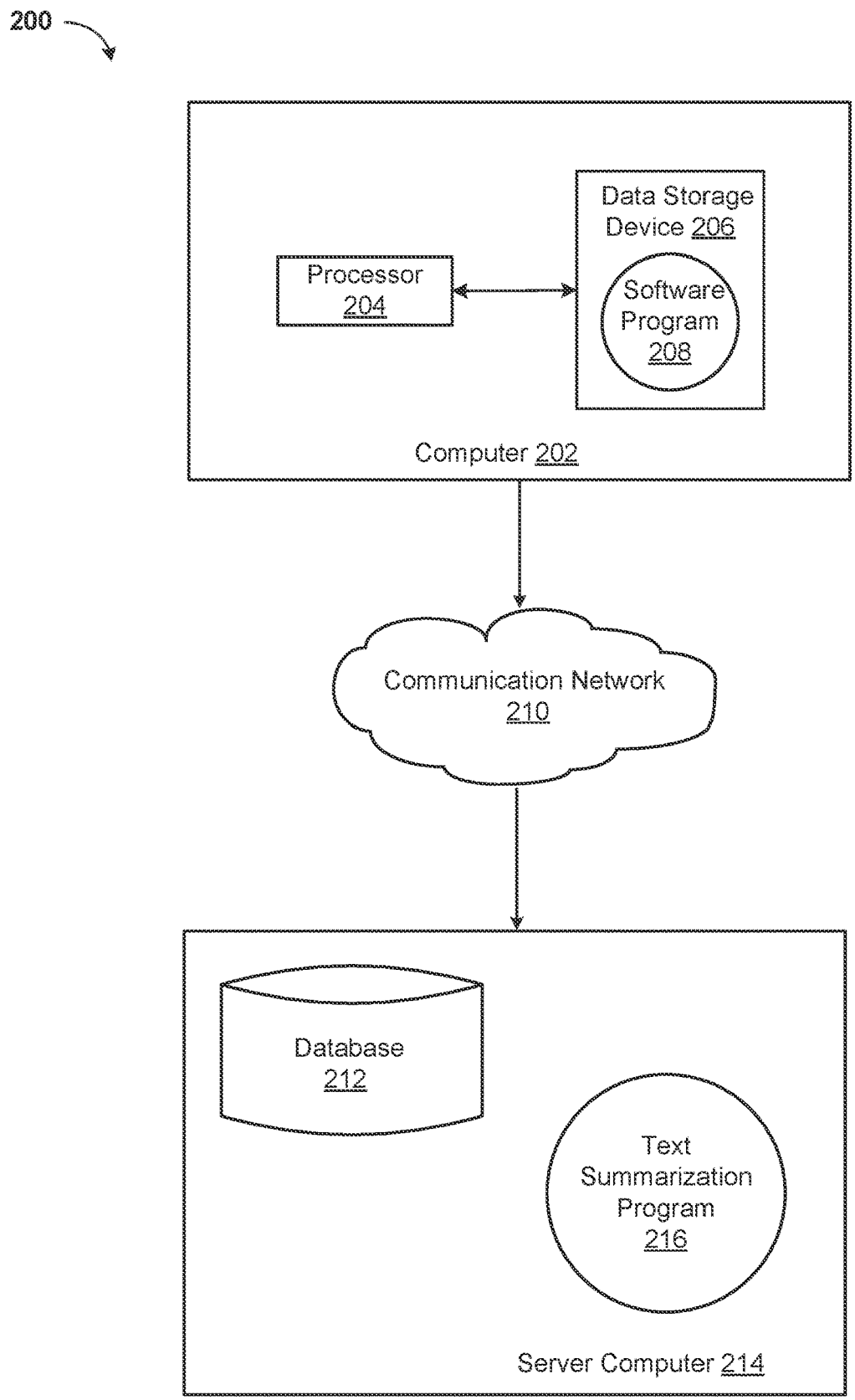
FIG. 2 illustrates a networked computer environment according to at least one embodiment

Referring now to FIG. 2, a functional block diagram of a networked computer environment illustrating a text summarization system 200 (hereinafter "system") for summarizing text based on emotion conditioning. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. As will be discussed below with reference to FIG. 6, the computer 202 may include internal components 800A and external components 900A, respectively, and the server computer 214 may include internal components 800B and external components 900B, respectively. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for text summarization is enabled to run a Text Summarization Program 216 (hereinafter "program") that may interact with a database 212. The Text Summarization Program is explained in more detail below with respect to FIG. 5. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger text summarization program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
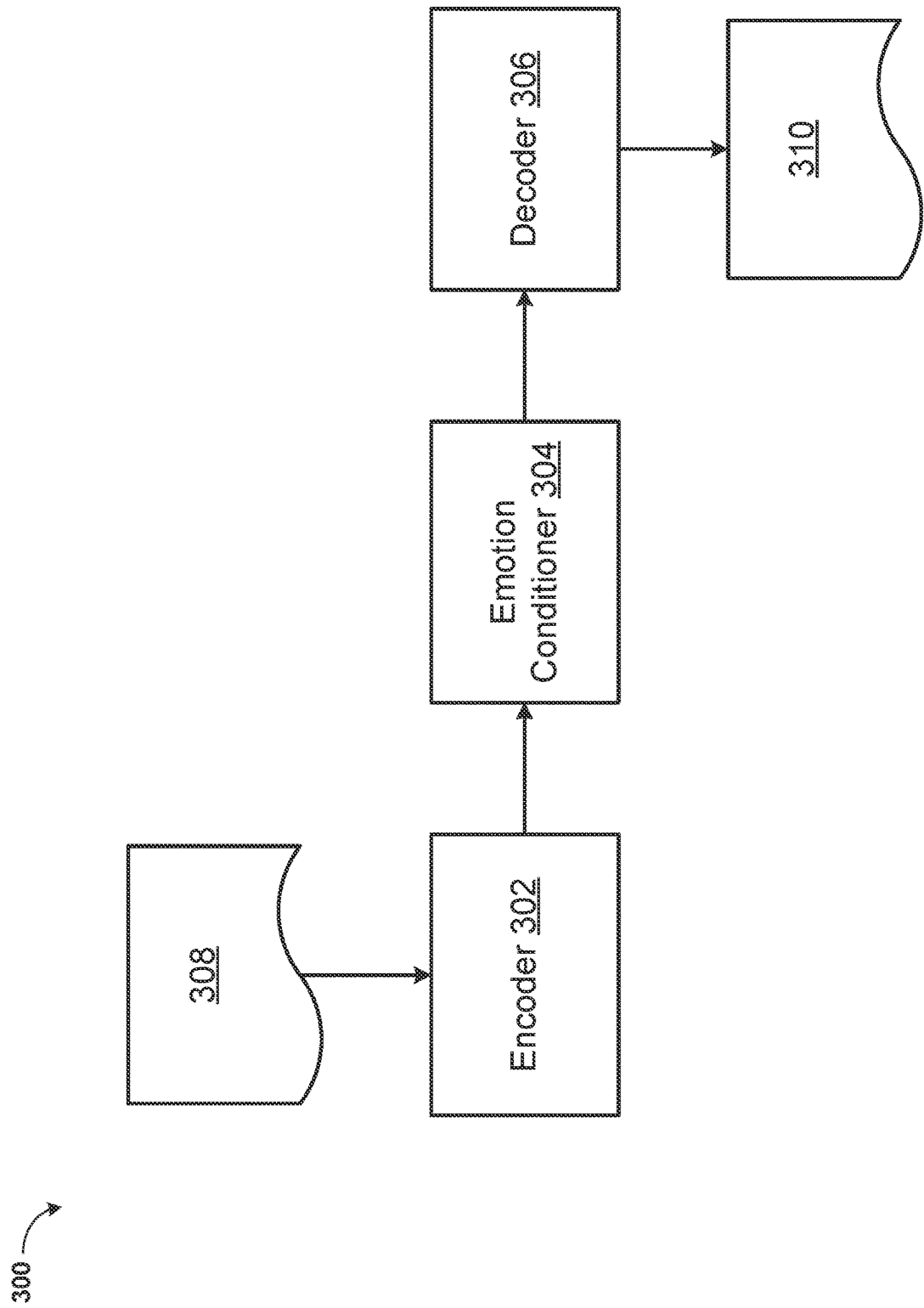
FIG. 3 is a block diagram of a system for text summarization, according to at least one embodiment.

Referring now to FIG. 3, Referring now to FIG. 3, a text summarization system 300 for summarizing text based on conditioning the text to include emotion is depicted according to one or more embodiments. The text summarization system 300 may generate a text summary with the user conditioned target emotion and the user conditioned emotion intensity for the given source text description. Enhancement of the text summarization process ensures that the generated summary is generated with the "user's choice of emotion" while also using the best summarization technique to generate the optimized summary of the source text. The text summarization system 300 may include, among other things, an encoder 302, an emotion conditioner 304, and a decoder 306.

The text summarization system 300 may use a Sequence-to-Sequence (seq2seq) models for a variety of NLP tasks, which may include, among other things, sequential information like sentiment classification, neural machine translation, and named entity recognition etc. The encoder 302 may receive data 308 as input, which may include a long sequence of words in a text body. The decoder 306 may output data 310, which may include a short text summary with emotion that may also be a sequence. Thus, text summarization by the text summarization system 300 may be modelled as a many-to-many seq2seq problem.

Figure 4:
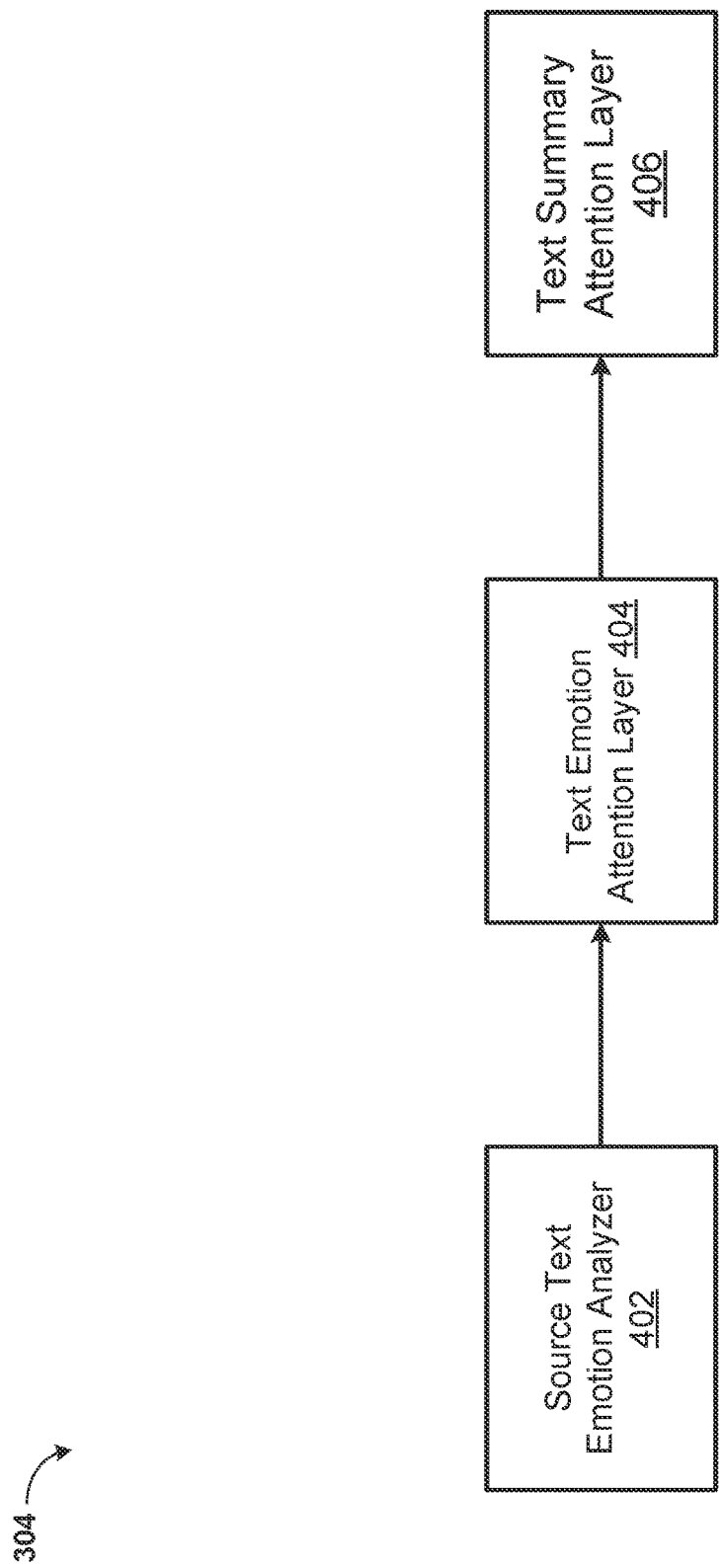
FIG. 4 is a block diagram of an emotion conditioner for text summarization, according to at least one embodiment.

The text summarization system 300 may be a bidirectional dual attention layered long-short term memory (LSTM) model for emotion-centric text summarization. The encoder 302 and the decoder 306 may each be a recurrent neural network (RNN). The emotion conditioner 304 will be described in further detail in FIG. 4.

The encoder 302 may read the data 308 such that, at each timestep, one word is fed into the encoder 302. The encoder 302 may process the data 308 at every timestep and may capture contextual information present in the data 308. The encoder 302 may be a first LSTM first that reads a source string in the data 308 word by word. The encoder 302 may encode the information in a hidden state and pass the context forward. On a complete pass, the encoder 302 may produce an encoding of the string or a through vector, which may capture all the information and context of the data 308. The data 308 may also include a target emotion, such as happiness or sadness. The target emotion may be assigned a token for standardization by the encoder 302. Because a user may wish to generate a summary to focus on a specific emotion, the token may be a predefined value in which <start> and <end> tokens are added to sentences of interest in the data 308 where the text may be summarized with the conditioned emotion. There may also be a token for summarization without the injection of an emotion. The data 308 may also include a target emotion intensity value that may be used to adjust the intensity of emotion conveyed through the generated text summary. The data 308 may also include a text summarization flag that may be set to determine whether the emotional content of the text should be changed without summarizing.

The decoder 306 may also be an LSTM network that may reads the entire target sequence word-by-word and predicts the same sequence offset by one timestep. The decoder 306 may be trained to predict the next word in the sequence given the previous word. The decoder 306 may emphasize the parts of the data 308 which are the most relevant for generating the next token based on an attention output from the emotion conditioner 304. The decoder 306 may use a backpropagation through time algorithm to calculate gradients and may apply one or more gradient descent algorithms to minimize the loss and learn good parameters. At each step, the decoder 306 may output a probability distribution over the target vocabulary from a dictionary. To get the output word at this step, the decoder 306 may use a beam search algorithm by choosing the top k high probable words based on the dual attention layer output. If the emotion score of the generated summary does not match with the intensity score of the input, then it is iterated over the same steps with length of the summarized output conditioned to be a constant equal to the length of the summary generated in the previous iteration with an offset Referring now to FIG. 4, an emotion conditioner 304, as depicted in FIG. 3, is depicted according to one or more embodiments. The emotion conditioner 304 may enhance the text summarization based on conditioning the text summary to include emotion. The emotion conditioner may include, among other things, a source text emotion analyzer 402, a text emotion attention layer 404, and a text summary attention layer 406.

$$\cos\theta = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}},$$

The source text emotion analyzer 402 may identify the emotions of the source text and determine a corresponding intensity associated with each of the identified emotions. Emotion of the textual data can be recognized by the source text emotion analyzer 402 by calculating a weight for emotion by adding weights assigned at each level of hierarchy. The source text emotion analyzer 402 may also calculate a weight for other emotions or retrieve predetermined weight values for the other emotions from a database and may compare the scores. The emotion having the greatest similarity score may be used as the detected emotion. The similarity score may be a cosine similarity score between the source and the target emotion:

$$\cos\theta = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}},$$

$$\cos\theta = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}},$$

where A and B correspond to the source and target emotions for each of n words in the input text. Emotion intensity may be calculated to decide if the conditioned target emotion can be applied on the input text. When the cosine similarity score between the source and the target emotion exceeds a preferred threshold value, then the given emotion condition can be applied on the text for summary. When the cosine similarity score between the source and the target emotion falls lower than the preferred threshold value, then the given emotion condition cannot be applied on the text for summary, and normal summarization occurs.

The text emotion attention layer 404 and the text summary attention layer 406 may be considered together as dual attention layers, which may allow for more attention on both the context of the input description for the summarization purpose and the conditioned target emotion so that the text summary can be generated with the user desired emotion. The text emotion attention layer 404 may builds attention towards the context of the words in both the directions so that the meaning is not lost. The text summary attention layer 406 may calculate the importance of each input emotion name and the corresponding intensity where it produces an importance vector. The importance vector may be converted to probabilities by passing the vector through a softmax function. A context vector may be calculated for the conditioned target emotion by multiplying with the encodings. The emotion context vector may be used to generate distribution over the vocabulary from which the summary may be sampled.

Figure 5:
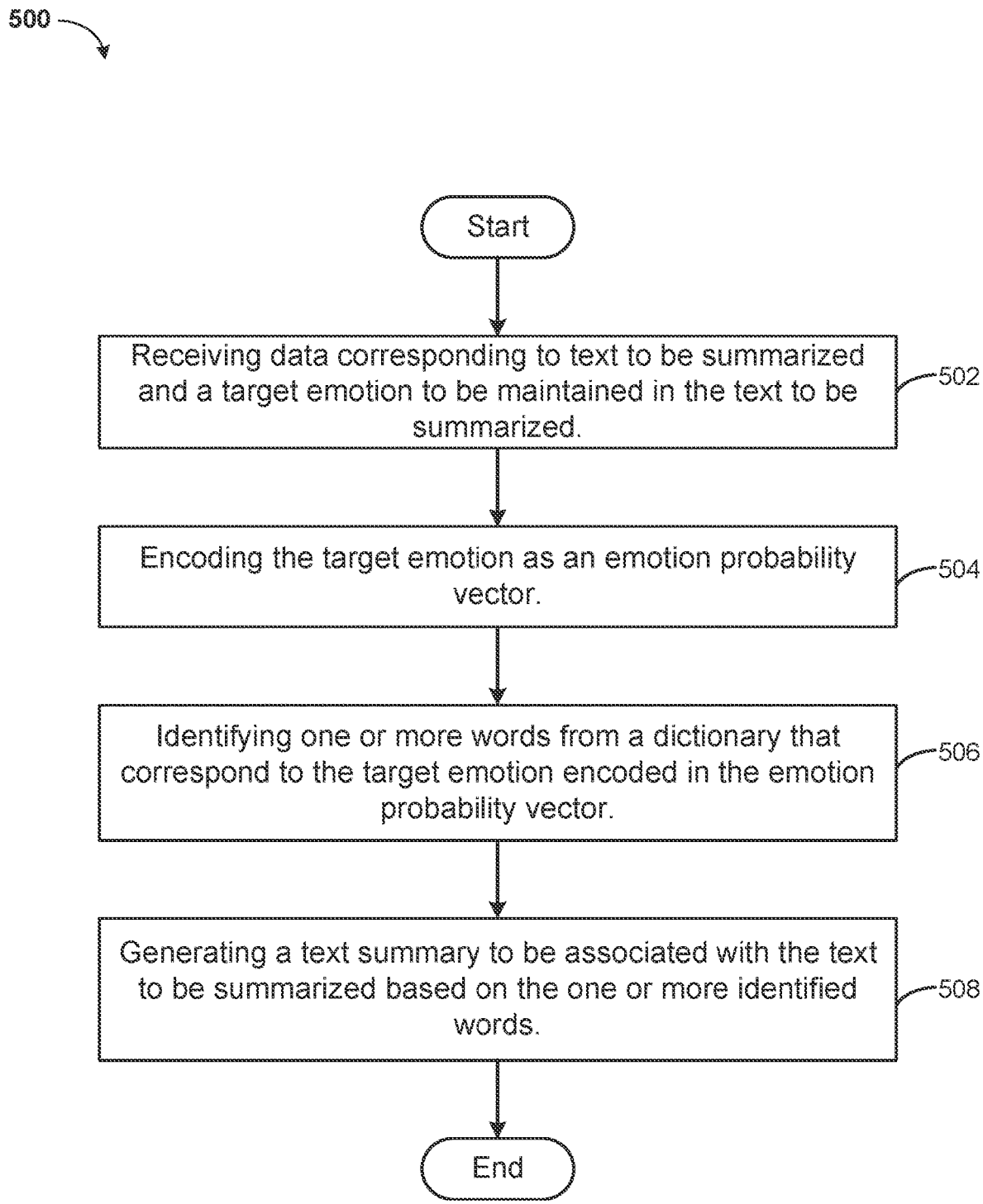
FIG. 5 is an operational flowchart illustrating the steps carried out by a program that summarizes text based on emotion conditioning, according to at least one embodiment.

Referring now to FIG. 5, an operational flowchart illustrating the steps of a method 400 carried out by a program that summarizes text based on emotion conditioning is depicted. The method 500 may be described with the aid of the exemplary embodiments of FIGS. 1-4.

At 502, the method 500 may include receiving data corresponding to text to be summarized and a target emotion to be maintained in the text to be summarized. The received data may also include an emotional intensity value associated with the target emotion. In operation, the encoder 302 (FIG. 3) may retrieve data 308 (FIG. 3) including text and target emotion data from the database 212 (FIG. 2) on the server computer 214 (FIG. 2) or may receive data 308 from the data storage device 206 (FIG. 2) on the computer 202 (FIG. 2) over the communication network 210 (FIG. 2).

At 504, the method 500 may include encoding the target emotion as an emotion probability vector. This may include generating an importance vector corresponding to an importance value associated with the target emotion and converting the importance vector to a probability vector through a softmax function. In operation, the encoder 302 (FIG. 2) may encode the data 308 (FIG. 3) as a probability vector.

At 506, the method 500 may include identifying one or more words from a dictionary that correspond to the target emotion encoded in the emotion probability vector. The words may be identified based on calculating a weight value for the target emotion, retrieving predetermined weight values of a set of emotions, and comparing the weight value for the target emotion to the retrieved predetermined weight values based on calculating a cosine similarity score. The words are identified based on an attention score associated with the target emotion. The words may also be identified based on the emotion intensity value. In operation, the emotion source text emotion analyzer 402 (FIG. 4) within the determine an emotion within the text based on the probability vector generated by the encoder 302 (FIG. 3). The text emotion attention layer 404 (FIG. 4) and the text summary attention layer 406 (FIG. 4) may identify words for summarizing the text with the target emotion based on calculating a dual attention score.

At 508, the method 500 may include generating a text summary to be associated with the text to be summarized based on the one or more identified words. Based on a text summarization flag being set, the generated text summary may only change an emotion associated with the text to be summarized. In operation, the decoder 306 (FIG. 3) may generate a text summary based on the emotion words identified by the emotion conditioner 304 (FIG. 3).

It may be appreciated that FIG. 5 provides only an illustration of one implementation and does not imply any limitations with regard to how different embodiments may be implemented. Many modifications to the depicted environments may be made based on design and implementation requirements.

Figure 6:
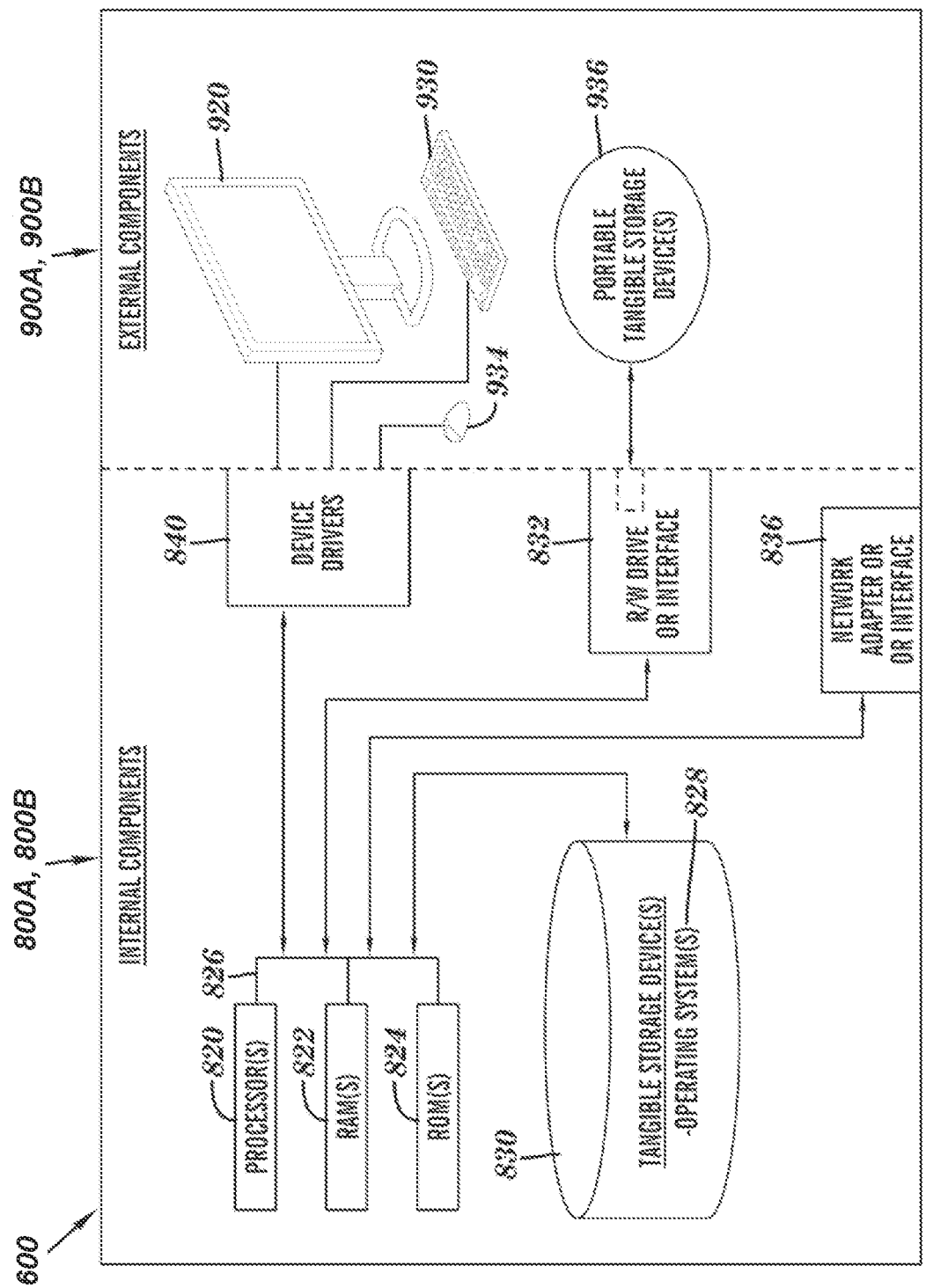
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Computer 202 (FIG. 2) and server computer 214 (FIG. 2) may include respective sets of internal components 800A,B and external components 900A,B illustrated in FIG. 6. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 include a component that permits communication among the internal components 800A,B.

The one or more operating systems 828, the software program 108 (FIG. 2) and the Text Summarization Program 216 (FIG. 2) on server computer 214 (FIG. 2) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid-state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a RAY drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 2) and the Text Summarization Program 216 (FIG. 2) can be stored on one or more of the respective portable computer-readable tangible storage devices 936, read via the respective RAY drive or interface 832 and loaded into the respective computer-readable tangible storage device 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 2) and the Text Summarization Program 216 (FIG. 2) on the server computer 214 (FIG. 2) can be downloaded to the computer 202 (FIG. 2) and server computer 214 from an external computer via a network (for example, the Internet, a local area network or other, wide area network) and respective network adapters or interfaces 836. From the network adapters or interfaces 836, the software program 108 and the Text Summarization Program 216 on the server computer 214 are loaded into the respective computer-readable tangible storage device 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of text summarization maintaining emotional content, the method executable by a processor, comprising:
    receiving data corresponding to text to be summarized and a target emotion to be maintained in the text to be summarized;
    encoding and tokenizing the target emotion as an emotion probability vector;
    identifying one or more words from a dictionary that correspond to the target emotion encoded in the emotion probability vector; and
    generating a text summary to be associated with the text to be summarized based on the one or more identified words.

2. The method of claim 1, wherein identifying the one or more words from the dictionary comprises:
    calculating a weight value for the target emotion to be maintained in the text to be summarized;
    retrieving predetermined weight values of a set of emotions; and
    comparing the weight value for the target emotion to the retrieved predetermined weight values based on calculating a cosine similarity score.

3. The method of claim 1, wherein the one or more words are identified based on an attention score associated with the target emotion.

4. The method of claim 1, wherein encoding the target emotion as the emotion probability vector comprises:
    generating an importance vector corresponding to an importance value associated with the target emotion; and
    converting the importance vector to the emotion probability vector through a softmax function.

5. The method of claim 1, wherein the received data further comprises an emotional intensity value.

6. The method of claim 5, wherein the one or more words that correspond to the target emotion are identified based on the emotional intensity value.

7. The method of claim 1, wherein based on a text summarization flag being set, the generated text summary changes only an emotion associated with the text to be summarized.

8. A computer system for text summarization maintaining emotional content, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive data corresponding to text to be summarized and a target emotion to be maintained in the text to be summarized;
encoding code configured to cause the one or more computer processors to encode and tokenize the target emotion as an emotion probability vector;
identifying code configured to cause the one or more computer processors to identify one or more words from a dictionary that correspond to the target emotion encoded in the emotion probability vector; and
generating code configured to cause the one or more computer processors to generate a text summary to be associated with the text to be summarized based on the one or more identified words.

9. The computer system of claim 8, wherein the identifying code comprises:
calculating code configured to cause the one or more computer processors to calculate a weight value for the target emotion;
retrieving code configured to cause the one or more computer processors to retrieve predetermined weight values of a set of emotions; and
comparing code configured to cause the one or more computer processors to compare the weight value for the target emotion to the retrieved predetermined weight values based on calculating a cosine similarity score.

10. The computer system of claim 8, wherein the one or more words are identified based on an attention score associated with the target emotion.

11. The computer system of claim 8, wherein the encoding code comprises:
generating code configured to cause the one or more computer processors to generate an importance vector corresponding to an importance value associated with the target emotion; and
converting code configured to cause the one or more computer processors to convert the importance vector to the emotion probability vector through a softmax function.

12. The computer system of claim 8, wherein the received data further comprises an emotional intensity value.

13. The computer system of claim 12, wherein the one or more words that correspond to the target emotion are identified based on the emotional intensity value.

14. The computer system of claim 8, wherein based on a text summarization flag being set, the generated text summary changes only an emotion associated with the text to be summarized.

15. A non-transitory computer readable medium having stored thereon a computer program for text summarization maintaining emotional content, the computer program configured to cause one or more computer processors to:
receive data corresponding to text to be summarized and a target emotion to be maintained in the text to be summarized;
encode and tokenize the target emotion as an emotion probability vector;
identify one or more words from a dictionary that correspond to the target emotion encoded in the emotion probability vector; and
generate a text summary to be associated with the text to be summarized based on the one or more identified words.

16. The computer readable medium of claim 15, wherein the computer program is further configured to cause the one or more computer processors to:
calculate a weight value for the target emotion to be maintained in the text to be summarized;
retrieve predetermined weight values of a set of emotions; and
compare the weight value for the target emotion to the retrieved predetermined weight values based on calculating a cosine similarity score.

17. The computer readable medium of claim 15, wherein the one or more words are identified based on an attention score associated with the target emotion.

18. The computer readable medium of claim 15, wherein the computer program is further configured to cause the one or more computer processors to:
generate an importance vector corresponding to an importance value associated with the target emotion; and
convert the importance vector to the emotion probability vector through a softmax function.

19. The computer readable medium of claim 15, wherein the received data further comprises an emotional intensity value.

20. The computer readable medium of claim 19, wherein the one or more words that correspond to the target emotion are identified based on the emotional intensity value.

* * * * *